United States Patent
di Tota et al.

(10) Patent No.: US 11,433,985 B2
(45) Date of Patent: Sep. 6, 2022

(54) DOOR FOR CARGO AIRPLANE

(71) Applicant: LEONARDO S.P.A., Rome (IT)

(72) Inventors: Antonello di Tota, Pomigliano d'Arco (IT); Gaetano Piccolo, Mariglianella (IT)

(73) Assignee: LEONARDO S.P.A., Rome (IT)

( * ) Notice: Subject to any disclaimer, the term of this patent is extended or adjusted under 35 U.S.C. 154(b) by 484 days.

(21) Appl. No.: 16/726,526

(22) Filed: Dec. 24, 2019

(65) Prior Publication Data

US 2020/0207453 A1 Jul. 2, 2020

(30) Foreign Application Priority Data

Dec. 31, 2018 (EP) ..................................... 18425110

(51) Int. Cl.
*B64C 1/14* (2006.01)
*E05B 13/00* (2006.01)
*E05B 79/20* (2014.01)
*E05B 85/10* (2014.01)
*E05B 85/12* (2014.01)

(52) U.S. Cl.
CPC .......... *B64C 1/1415* (2013.01); *E05B 13/002* (2013.01); *E05B 79/20* (2013.01); *E05B 85/10* (2013.01); *E05B 85/12* (2013.01); *E05Y 2900/502* (2013.01); *E05Y 2900/531* (2013.01)

(58) Field of Classification Search
CPC ..... B64C 1/1415; E05B 13/002; E05B 79/20; E05B 85/10; E05B 85/12; E05Y 2900/502; E05Y 2900/531
See application file for complete search history.

(56) References Cited

U.S. PATENT DOCUMENTS

| 2,748,855 A * | 6/1956 | Siems ................... B64C 1/1415 160/180 |
| 4,473,201 A * | 9/1984 | Barnes .................. B64C 1/1415 292/216 |
| 4,497,462 A | 2/1985 | Hamatani |

(Continued)

FOREIGN PATENT DOCUMENTS

| EP | 0 743 240 | 11/1996 |
| GB | 1 228 469 | 4/1971 |
| WO | WO 2008/041023 | 4/2008 |

*Primary Examiner* — Mark A Williams
(74) *Attorney, Agent, or Firm* — Leason Ellis LLP

(57) ABSTRACT

Door for cargo airplane, wherein a cargo compartment is accessible from the outside of the fuselage through an opening for loading goods provided with the door. The door is provided with a first operating handle accessible from the outside of the door and used to lock/unlock the pins that are used to connect the door to the fuselage and control the closing/opening of a ventilation door; and a second operating handle accessible from the outside of the door for advancing/retracting the pins in/from respective seats. According to the invention, the door is provided with a third handle accessible from the inside of the door and mechanically interconnected with the first handle for locking/unlocking the pins and controlling the closing/opening of the ventilation door; and a fourth operating handle accessible from the inside of the door and mechanically interconnected with the second handle for advancing/retracting the pins in/from respective seats.

3 Claims, 3 Drawing Sheets

(56) References Cited

U.S. PATENT DOCUMENTS

| | | | | |
|---|---|---|---|---|
| 5,064,147 A | * | 11/1991 | Noble | B64C 1/1407 |
| | | | | 292/DIG. 31 |
| 6,454,210 B1 | * | 9/2002 | Plattner | B64C 1/1415 |
| | | | | 244/129.5 |
| 2003/0230573 A1 | * | 12/2003 | Enge | B65D 88/14 |
| | | | | 220/1.5 |
| 2015/0283571 A1 | * | 10/2015 | Sais | B26F 1/44 |
| | | | | 83/13 |
| 2015/0337570 A1 | * | 11/2015 | Powell | E05B 63/14 |
| | | | | 292/336.3 |
| 2021/0229792 A1 | * | 7/2021 | Blum | B64C 1/1415 |
| 2022/0126977 A1 | * | 4/2022 | Boehme | H01Q 1/42 |
| 2022/0136290 A1 | * | 5/2022 | Tendyra | E05B 83/02 |
| | | | | 49/394 |

* cited by examiner

DOOR FOR CARGO AIRPLANE

CROSS-REFERENCE TO RELATED APPLICATIONS

This patent application claims priority from European patent application no. 18425110.6 filed on Dec. 31, 2018, the entire disclosure of which is incorporated herein by reference.

FIELD OF THE INVENTION

The present invention relates to a door for a cargo airplane.

BACKGROUND OF THE INVENTION

All airplanes used for the transport of goods are equipped with at least one door that opens outwards and upwards to ensure access to a cargo compartment and to load/unload the goods contained in the cargo compartment.

Cargo doors are provided with latching/unlatching and locking/unlocking systems that are electrically or mechanically controlled (typically by means of handles) exclusively from the outside of the cargo compartment. In fact, the cargo compartment is generally not accessible from the cockpit and therefore there is no need to have doors with controls that can be operated from the inside of the cargo compartment.

In this way, if the cargo compartment is instead accessible from the cockpit, the cargo doors of known type cannot be operated from the inside of the aircraft and an operator on board the aircraft cannot operate (lock/unlock, latch/unlatch, lift/lower) the cargo door. It is therefore necessary the presence of ground staff or the help of a crewmember, who leaves the plane to operate the cargo door from the outside. All of this involves long and complex loading/unloading procedures.

It is therefore felt the need to manufacture a door for a cargo airplane that can be operated both from the outside and from the inside of the cargo compartment.

A latch-lock mechanism for an airplane cargo door is disclosed in EP-743.240.

SUMMARY OF THE INVENTION

The previous object is achieved by the present invention since it relates to a door for a cargo airplane in which a cargo compartment is accessible from the outside of the fuselage through an opening for loading goods provided by the door, the door being in turn provided with: a first locking/unlocking device provided with a first operating handle accessible from the outside of the door (1) and angularly movable between a first locking position and a second unlocking position and comprising a first transmission configured to transmit the rotation of the first handle to a first shaft, angularly movable about its axis (A) to operate a locking/unlocking mechanism of the pins that are used to connect the door to the fuselage; a first latching/unlatching device provided with a second operating handle accessible from the outside of the door and angularly movable between a first latching position and a second unlatching position and comprising a second transmission configured to transmit the rotation of the second handle to a second shaft angularly movable about its own axis (B) to operate a mechanism controlling the advancement/retraction of the pins in/from respective seats and controlling the closing/opening of a ventilation door, which connects the cargo compartment with the outside of the fuselage; characterized in that it comprises: a second locking/unlocking device provided with a third operating handle accessible from the inside of the door and angularly movable between a first locking position and a second unlocking position and comprising a third transmission configured to transmit the rotation of the third handle to the first shaft so that the first handle and the third handle are mechanically interconnected and control the same first shaft to allow the locking/unlocking of the pins; a second latching/unlatching device provided with a fourth operating handle accessible from the inside of the door and angularly movable between a first latching position and a second unlatching position and comprising a fourth transmission configured to transmit the rotation of the fourth handle to said second shaft so that the second handle and the fourth handle are mechanically interconnected and control the same second shaft for advancing/retracting the pins in/from respective seats as well as the closing/opening of the ventilation door.

DESCRIPTION OF THE DRAWINGS

The invention will now be illustrated with reference to the accompanying drawings showing a preferred embodiment thereof, in which.

DESCRIPTION OF THE INVENTION

Figure 1:
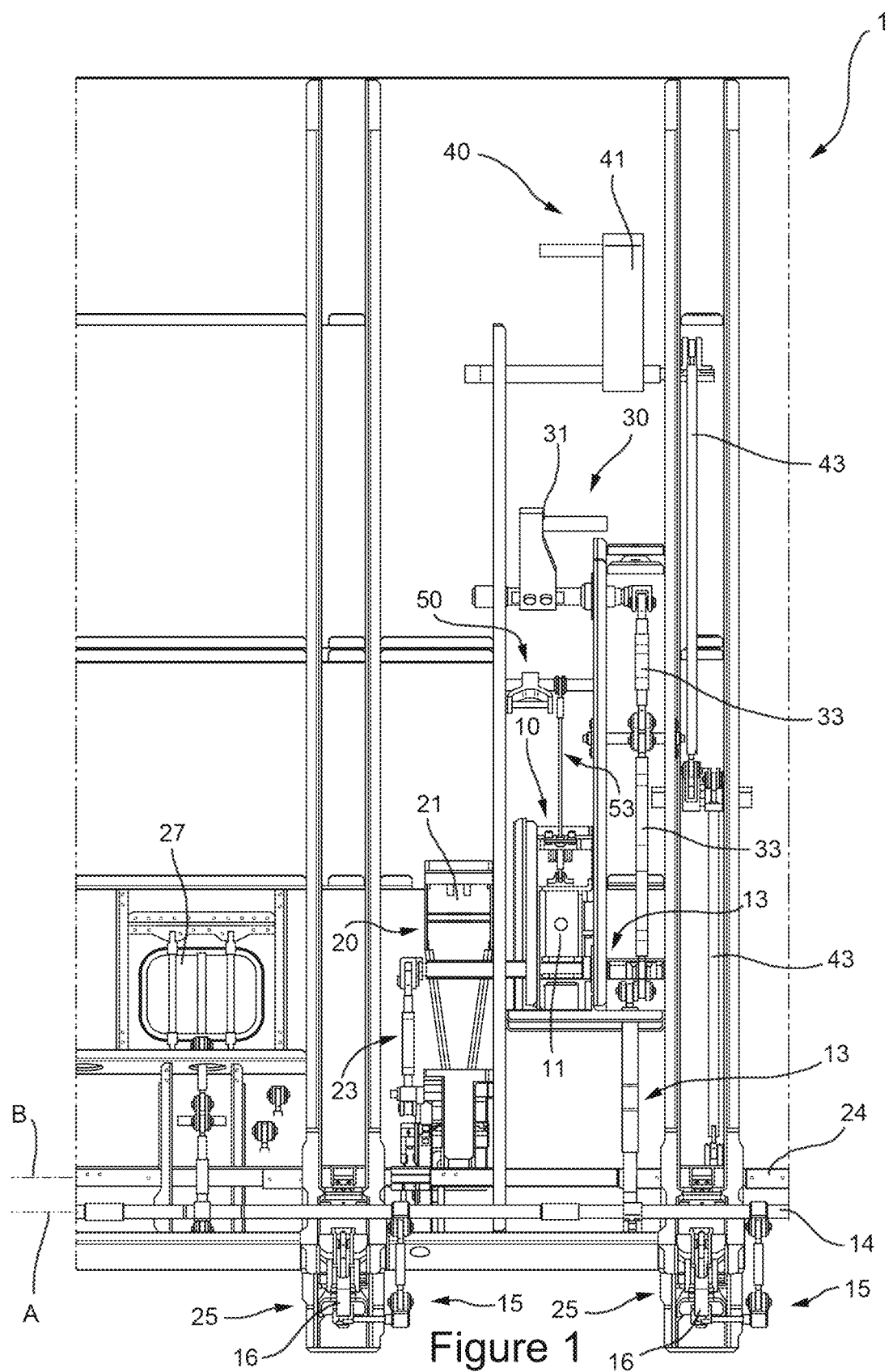
FIG. 1 is a front view of a door for a cargo airplane made according to the dictates of the present invention.
Figure 4:
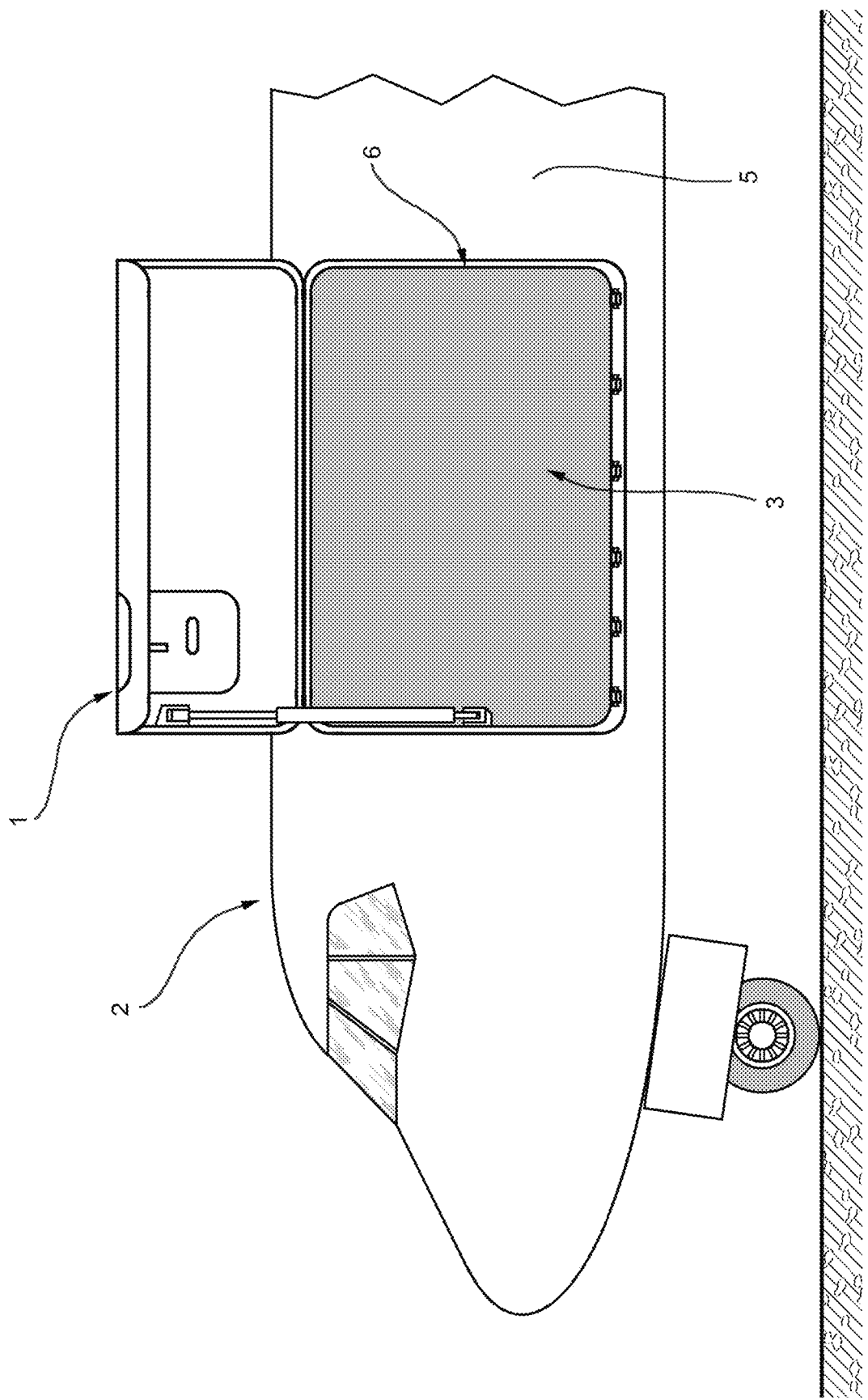
FIG. 4 shows a front portion of a cargo airplane provided with a door made according to the dictates of the present invention.

FIG. 1 shows as a whole a 1 a door for a cargo airplane 2 (shown in FIG. 4), in which a cargo compartment 3 is accessible from the outside of the fuselage 5 through an opening for loading goods 6 provided by the cargo door 1.

Figure 3:
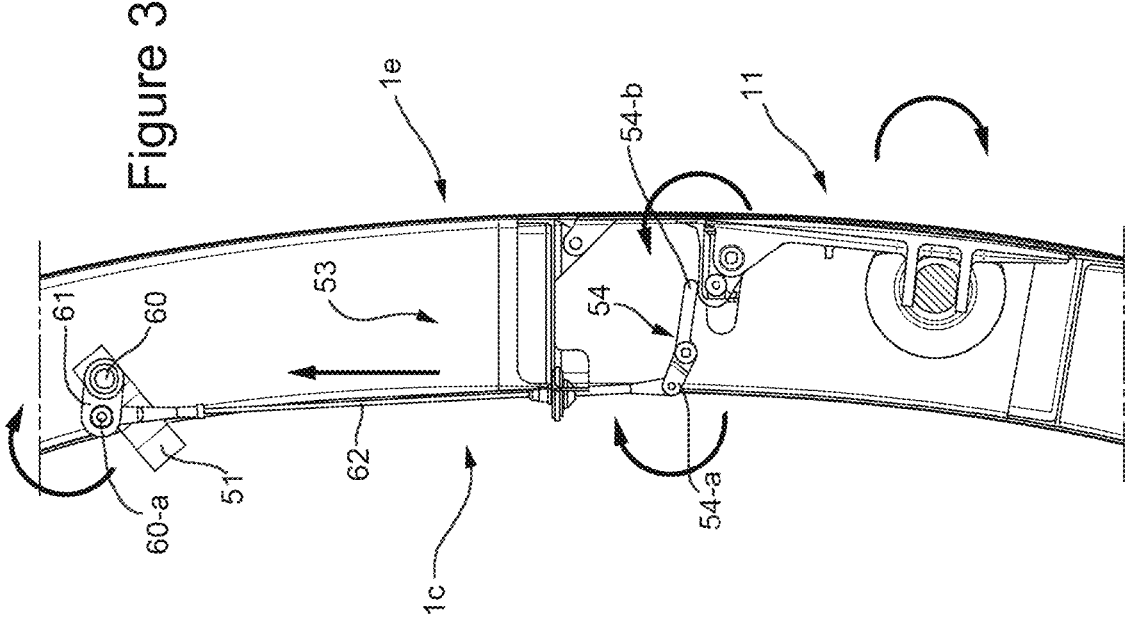
FIG. 3 is a section of FIG. 2.

The door 1 is provided with:

a first locking/unlocking device 10 provided with a first operating handle 11 accessible from the outside 1e (see FIG. 3) of the door 1 (and therefore from the outside of the fuselage 5) and angularly movable between a first locking position and a second unlocking position and comprising a first transmission 13 configured to transmit the rotation of the first handle 11 to a first shaft 14 arranged in a lower portion of the door 1 and angularly movable about its axis A to operate a locking/unlocking mechanism 15 (of known type) of the pins 16 that are used to connect the door 1 to the fuselage 5 and control the closing/opening of a ventilation door 27 (of a known type and therefore not further illustrated), which connects the cargo compartment 3 with the outside of the fuselage; and a first latching/unlatching device 20 provided with a second operating handle 21 accessible from the outside 1e of the door 1 and angularly movable between a first latching position and a second unlatching position and comprising a second transmission 23 configured to transmit the rotation the second handle 21 to a second shaft 24 angularly movable about its own axis B to operate a mechanism 25 (of a known type) controlling the advancement/retraction of the pins 16 in the respective seats formed on the fuselage 5 (not shown).

The first handle 11 has a mechanical safety system that prevents the "involuntary" operation of the first locking/ unlocking device. It consists of a further handle (not shown for simplicity's sake) that is provided with two pins that, when the door is closed, engage in two fittings, thus locking the movement of the whole handle 11 until the safety handle (not shown) is voluntarily operated.

According to the present invention, the door 1 is further provided with: a second locking/unlocking device 30 provided with a third operating handle 31 accessible from an inner side 1c (see FIG. 3) of the door 1 and angularly movable between a first locking position and a second unlocking position and comprising a third transmission 33 configured to transmit the rotation of the third handle 31 to the first shaft 14 so that the first handle 11 and the third handle 31 are mechanically interconnected and control the same first shaft 14 to allow locking/unlocking the pins 16 and closing/opening the ventilation door 27; and a second latching/unlatching device 40 provided with a fourth operating handle 41 accessible from the inside of the door 1 and angularly movable between a first latching position and a second unlatching position and comprising a fourth transmission 43 configured to transmit the rotation of the fourth handle 41 to the second shaft 24 so that the second handle 21 and the fourth handle 41 are mechanically interconnected and control the second shaft 24 for advancing/retracting the pins 16 in/from respective seats.

The internal handles 31/41 are arranged to ensure a comfortable operability by the crewmember. Moreover, the range of motion and the effort applicable to the handle 31/41 is adequate to the available space and to the regulations in force thanks to a third/fourth transmission 33/43 comprising, for example, a return mechanism to rods and rockers.

Figure 2:
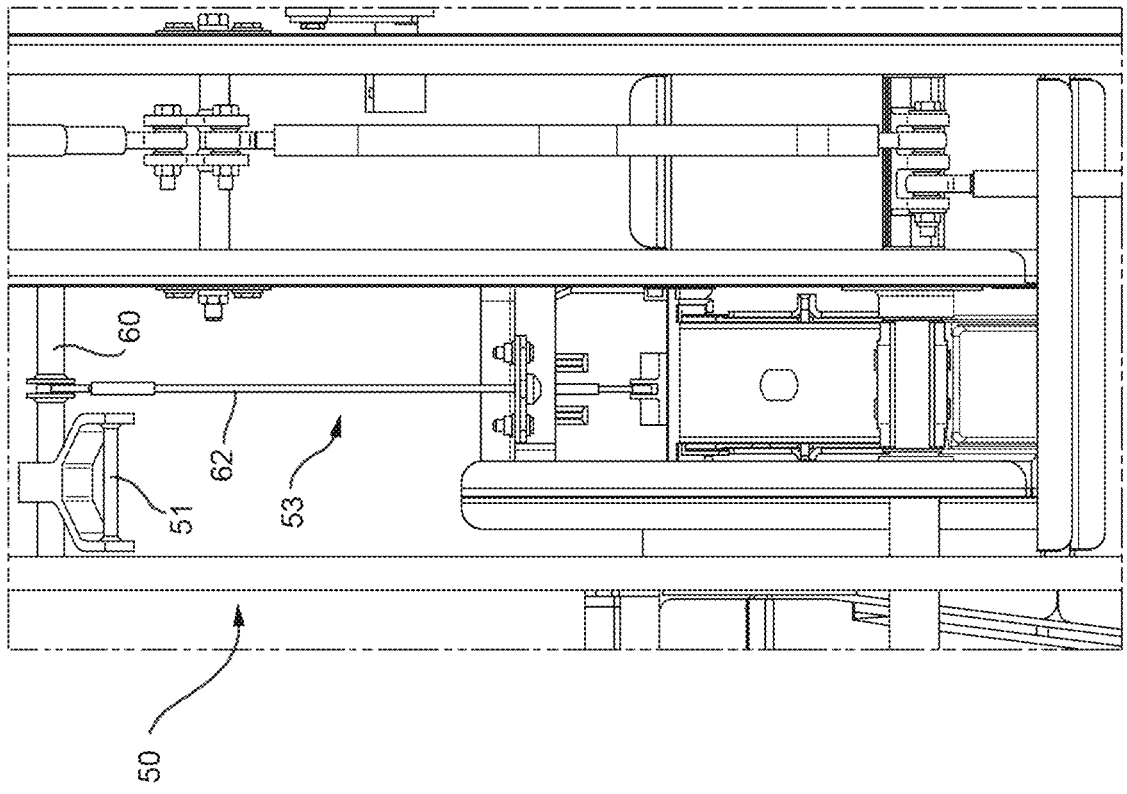
FIG. 2 shows, on an enlarged scale, a detail of the airplane door made according to the dictates of the present invention.

It is further provided a safety device 50 (see also FIGS. 2 and 3), which prevents the "involuntary" operation of the second locking/unlocking device 30. The safety device 50 is provided with a fifth mechanical safety handle 51 accessible from the inner side 1c of the door 1 and angularly movable between a first locking position and a second unlocking position and comprising a fifth transmission 53 configured to actuate a retaining element 54, which couples/uncouples with a portion of the first handle 11 by alternately arranging the first handle 11 in a first state in which the angular rotation of the first handle 11 is prevented and in a second state in which the angular rotation of the first handle 11 is permitted.

The safety device 50 comprises the fifth handle 51 angularly movable about a third shaft 60, an extension 61 radially extending from the third shaft 60 and having a free end 60-a, and the retaining element 54, which is hinged about an axis parallel to the third shaft 60 and is provided with a first end portion 54-a interconnected with the free end 60-a by a Teleflex cable 62. The retaining element 54 is provided with a second end portion 54-b shaped to engage an inner portion of the first handle 11 to prevent its angular rotation.

In use, the following operations are carried out for unlocking and opening the door 1 from the inside of the cargo compartment 3.

The operator actuates the fifth mechanical safety handle 51 by rotating it upwards, i.e. by arranging it in the second unlocking position. The rotation of the fifth mechanical safety handle 51 is transmitted through the Teleflex cable 62 to the retaining element 54 so that the second end portion 54-b uncouples from the first handle 11, thus releasing it.

Obviously, by operating in reverse the mechanical safety handle 51 during the closing step, the second end portion 54-b engages the handle 11, which is then locked.

Subsequently, the operator acts on the third handle 31 bringing it manually from the first locking position to the unlocking position, thus allowing the unlocking of the pins 16 and the opening of the ventilation door 27.

Once the third handle 31 has reached the end of the stroke, it is possible to operate on the fourth handle 41, which is brought from the first latching position to the unlatching position, thus achieving the retraction of the pins 16 from the respective seats.

At this point, the door 1 can be lifted by means of the known hydraulic controls present both inside and outside of the aircraft.

The operations of unlocking and opening of the door are thus carried out without the help of external staff.

Obviously, all the operations illustrated above, carried out in the reverse order with respect to the one described, allow closing, latching and locking the door 1 from the inside of the aircraft without the need of external staff. The application of the shown solution allows simplifying the operations of loading/unloading the airplane in a freighter configuration. The presence of internal handles 31, 41 and 51 allows the crew to operate independently, without the assistance of ground staff, thus reducing time and costs and increasing safety.

The internal handles 31 and 41 act on the already existing control shafts 14 and 24 and therefore do not introduce new mechanisms that would involve a drastic weight increase.

The invention claimed is:

1. A door (1) of a cargo airplane (2), wherein a cargo compartment (3) of the cargo airplane is accessible from the outside of the fuselage (5) through an opening of the cargo airplane for loading goods (6), the door being provided with:
   a first locking and unlocking device (10) provided with a first operating handle (11) accessible from the outside of the door (1) and the first operating handle being angularly movable between a first locking position and a second unlocking position, and the first locking and unlocking device comprising a first transmission (13) configured to transmit the rotation of the first handle (11) to a first shaft (14) angularly movable about its axis (A) to control a locking and unlocking mechanism (15), the locking and unlocking mechanism comprising of pins (16) that when in use are used to connect the door (1) to the fuselage (5) and to control the closing and opening of a ventilation door (27), the ventilation door used for connecting the cargo compartment (3) with the outside of the fuselage (5);
   a first latching and unlatching device (20) provided with a second operating handle (21) accessible from the outside of the door (1) and the second handle being angularly movable between a first latching position and a second unlatching position, and the second latching and unlatching device comprising a second transmission (23) configured to transmit the rotation of the second handle (21) to a second shaft (24) angularly movable about its axis (B) to operate a mechanism controlling an advancement and a retraction of the pins (16) into and away from respective seats;
   the door characterized in that it comprises:
   a second locking and unlocking device (30) provided with a third operating handle (31) accessible from the inside of the door (1) and the third handle angularly movable between a first locking position and a second unlocking position, and the second locking and unlocking device comprising a third transmission (33) configured to transmit the rotation of the third handle (31) to the first shaft (14) so that the first handle (11) and the third handle (31) are mechanically interconnected and control the same first shaft (14) to allow locking and unlocking of the pins (16) and thereby closing and opening of the ventilation door (27);

a second latching and unlatching device (40) provided with a fourth operating handle (41) accessible from the inside of the door (1) and the fourth handle angularly movable between a first latching position and a second unlatching position, and the second latching and unlatching device comprising a fourth transmission (43) configured to transmit the rotation of the fourth handle (41) to said second shaft (24) so that the second handle (21) and the fourth handle (41) are mechanically interconnected and control the second shaft (24) for advancing and a retracting the pins (16) into and away from respective seats.

2. The door according to claim 1, wherein a safety device (50) is provided with a fifth mechanical safety handle (51) accessible from the inner side (1c) of the door (1) and angularly movable between a first locking position and a second unlocking position and comprising a fifth transmission (53) configured to actuate a retaining element (54) coupling/uncoupling with an inner portion of the first handle (11), alternately arranging the first handle (11) in a first state in which the angular rotation of the first handle (11) is prevented and in a second state in which the angular rotation of the first handle (11) is permitted.

3. The door according to claim 2, wherein the safety device (50) comprises the fifth mechanical safety handle (51) angularly movable about a third shaft (60), an extension (61) extending radially from the third shaft (60) and having a free end (60-a), the retaining member (54) that is hinged about an axis parallel to the third shaft (60) and is provided with a first end portion (54-a) interconnected with the free end (60-a) through a cable (62); the retaining element (54) being provided with a second end portion (54-b) shaped to engage an inner portion of the first handle (11) to prevent its angular rotation if it is in the first state.

\* \* \* \* \*